(12) United States Patent
Nichols

(10) Patent No.: US 8,281,644 B2
(45) Date of Patent: Oct. 9, 2012

(54) HYDROSTATIC TESTER

(75) Inventor: Jim Quentin Nichols, Mansfield, TX (US)

(73) Assignee: Jim Quentin Nichols, Mansfield, TX (US)

( * ) Notice: Subject to any disclaimer, the term of this patent is extended or adjusted under 35 U.S.C. 154(b) by 363 days.

(21) Appl. No.: 12/802,203

(22) Filed: Jun. 2, 2010

(65) Prior Publication Data

US 2011/0296901 A1     Dec. 8, 2011

(51) Int. Cl.
*G01N 15/08* (2006.01)

(52) U.S. Cl. ............. 73/38; 73/37; 73/159; 73/438

(58) Field of Classification Search ........ 73/37, 38, 73/159, 438
See application file for complete search history.

(56) References Cited

U.S. PATENT DOCUMENTS

| | | | | |
|---|---|---|---|---|
| 1,538,793 A * | 5/1925 | Gallagher et al. | | 73/38 |
| 1,660,024 A * | 2/1928 | Abrams | | 73/38 |
| 1,827,562 A * | 10/1931 | Carpenter | | 73/38 |
| 2,755,660 A * | 7/1956 | Kammermeyer et al. | | 73/38 |
| 2,880,609 A * | 4/1959 | Byrkett et al. | | 73/38 |
| 3,111,836 A * | 11/1963 | Emmons, III | | 73/38 |
| 3,248,930 A * | 5/1966 | Speegle et al. | | 73/38 |
| 3,286,509 A * | 11/1966 | Gluckman et al. | | 73/38 |
| 3,433,056 A * | 3/1969 | Nyffenegger et al. | | 73/38 |
| 3,548,634 A * | 12/1970 | Salil | | 73/38 |
| 3,577,767 A * | 5/1971 | Stedile | | 73/38 |
| 4,385,517 A * | 5/1983 | Sorce et al. | | 73/38 |
| 4,389,878 A * | 6/1983 | Manzie, Jr. | | 73/38 |
| 4,581,921 A * | 4/1986 | Gillespie et al. | | 73/73 |
| D300,726 S * | 4/1989 | Ebeling | | D10/46 |
| 4,846,970 A * | 7/1989 | Bertelsen et al. | | 210/232 |
| 5,390,531 A | 2/1995 | Taylor | | |
| 5,438,863 A * | 8/1995 | Johnson | | 73/54.02 |
| 5,535,616 A * | 7/1996 | Bors et al. | | 73/38 |
| 5,866,801 A * | 2/1999 | Johnson et al. | | 73/38 |
| 5,887,477 A | 3/1999 | Newman | | |
| 6,212,941 B1 * | 4/2001 | Cholet | | 73/38 |
| 6,266,999 B1 * | 7/2001 | Arnshav | | 73/38 |
| 6,543,275 B2 * | 4/2003 | Wu et al. | | 73/38 |
| 6,655,192 B2 * | 12/2003 | Chavdar | | 73/38 |
| 6,860,148 B2 * | 3/2005 | Kossuth et al. | | 73/159 |
| 6,948,354 B1 * | 9/2005 | Chen et al. | | 73/38 |
| 7,210,335 B2 * | 5/2007 | Gupta et al. | | 73/38 |
| 7,257,990 B2 * | 8/2007 | Bujas et al. | | 73/38 |

* cited by examiner

*Primary Examiner* — David Rogers
(74) *Attorney, Agent, or Firm* — Lynn E. Barber

(57) ABSTRACT

A hydrostatic tester is provided with an elevated test surface allowing tests to be made inside sleeves, pants legs or other hard to reach locations of completed garments. A constant force spring is engaged by way of a straight line clamp to apply pressure and maintain a consistent and constant force on a sandwich seal. A clamping mechanism can be moved to the left or right of test area to provide a clear unobstructed access to position test item. A raised gasket on the test surface prevents hard contact between test surface and seal ring avoiding damage to test items. A blood pressure bulb is used as a pressure source to force water from a reservoir to the test area. A low pressure gauge is positioned for easy viewing to monitor test pressure.

6 Claims, 7 Drawing Sheets

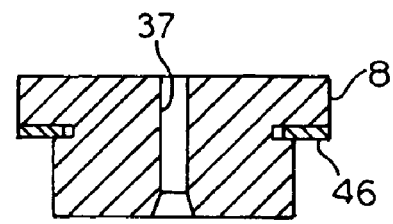
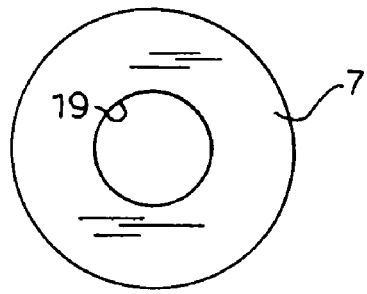
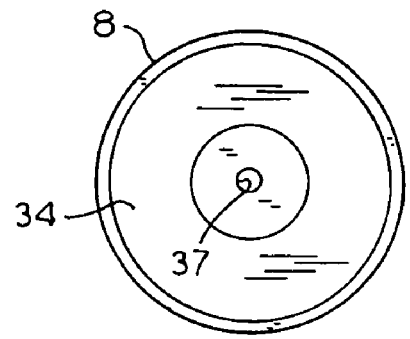
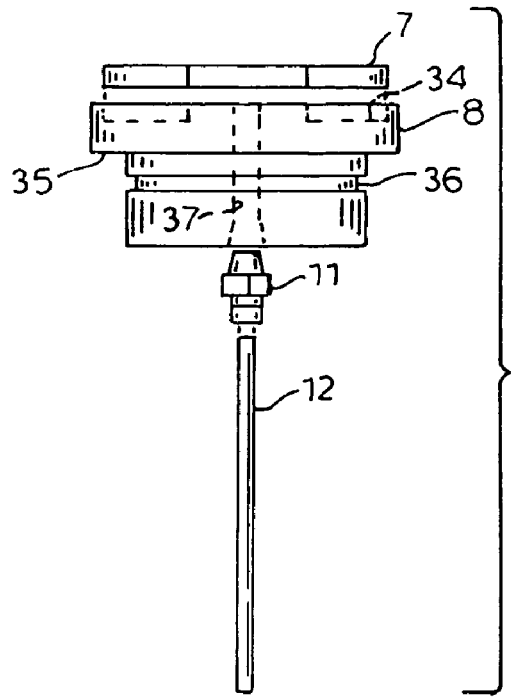

HYDROSTATIC TESTER

BACKGROUND OF INVENTION

This invention pertains to an evaluation apparatus that meets the requirements specified in AATCC 127, Water Resistance: Hydrostatic Pressure Test. The invention is targeted for but not limited to the use with completed garments, large bulky designs and other items that require an increased testing area and the portability of field testing. Usability, portability, versatile and affordability are incorporated into this invention.

BACKGROUND OF THE INVENTION

Standards for hydrostatic pressure testing of fabrics are set forth by the AATCC (American Association of Textile Chemists and Colorists). To follow the standards used for firefighting garments, for example, hydrostatic testing devices are used for testing waterproof garments and the like for leaks. Existing hydrostatic testing devices incorporate six basic features:
1. A surface area on which a test item is positioned;
2. A sealing device that can be placed over the test item, sealing off the test area;
3. Some form of applied pressure system for the sealing device;
4. A method to apply a static pressure to the test area;
5. A static pressure monitor and or pressure measuring device; and
6. A reservoir to hold test liquid.

Most testers are designed for laboratory use where small samples of a test item are evaluated. Some require electrical power for pumps and high maintenance pressure regulator devices. Various applied pressure devices are used, from a screw system to toggle clamps. Each type of pressure device has advantages and disadvantages. In screw systems the applied pressure can vary greatly, causing damage to the test item. Toggle clamps require a pre-set applied pressure setting and do not compensate for test item gauge variances or uneven surfaces. Test areas are small and do not accommodate completed garments or large bulky test items. Few of the devices are operator and test item friendly.

Examples of testers include the apparatus of Newman with a demonstration unit and a base unit connected by a water conduit (U.S. Pat. No. 5,887,477), the whole garment leak test invention of Taylor (U.S. Pat. No. 5,390,531), and the SUTER TESTER™ having two pressure gauges, and using a hand wheel to lower an upper pressure plate, which moves up and down only.

It is therefore an object of the invention to provide a hydrostatic tester that in a first embodiment has a raised pedestal with a test face upon which the fabric to be tested is placed, a clamp that lowers a seal to the test face for testing and may be swung aside to facilitate positioning of the fabric on the pedestal, a spring that maintains a constant force on the fabric, and a raised gasket upon which the fabric is placed so that there is not metal to metal contact when the fabric is clamped. In a second embodiment, a test arm having a test face plate on it replaces the raised pedestal.

SUMMARY OF THE INVENTION

While in general this invention contains the six features found in prior hydrostatic testing devices of this category, the unique use of mechanical concepts, improved versatility and increased test area sets it apart from other designs. The invention provides an elevated test surface or pedestal concept with a more accessible test area. This allows tests to be made inside sleeves, pants legs or other hard to reach locations of completed garments and provides extra space for the overflow of a test item during a test to be stored. The combination of the frame design and use of a constant force spring in the applied pressure mechanism maintains a consistent and constant force on the seal ring. Fabric gauge, texture, and irregular surfaces can be tested without making adjustments or damaging the test item. In the invention, the constant force spring's flexibility compensates for any parallel differences between the seal ring and test surface. The unobstructed access to the test area improves the usability of this invention. The ability to move the clamping mechanism to the left or right of the test area provides a clear unobstructed access to position the test item. The raised gasket on the test surface prevents hard contact between test surface and seal ring avoiding damage to test item. The rugged frame design and lack of any external connection requirements improves the portability of the invention. The use of a blood pressure bulb for the hydrostatic pressure source puts the operator in complete control of the test. The location and angle of the hydrostatic pressure monitor improves the usability of the invention. The low profile open seal ring improves the visual view of the test area. The unique method of reservoir access improves the usability or operator friendliness of the invention. A manufacturing friendly design reduces the end cost of the invention.

BRIEF DESCRIPTION OF THE DRAWINGS

FIG. 6 is a top plan view of the gasket used in the hydrostatic tester of FIG. 1.

FIG. 7 is a side elevational view of the combination part and test area of the invention of FIG. 1.

FIG. 7A is a cross-sectional elevational view of the face seal in an alternative second version of the first embodiment.

FIG. 8 is a top plan view of the test area of the invention of FIG. 1.

DETAILED DESCRIPTION OF INVENTION

Figure 1:
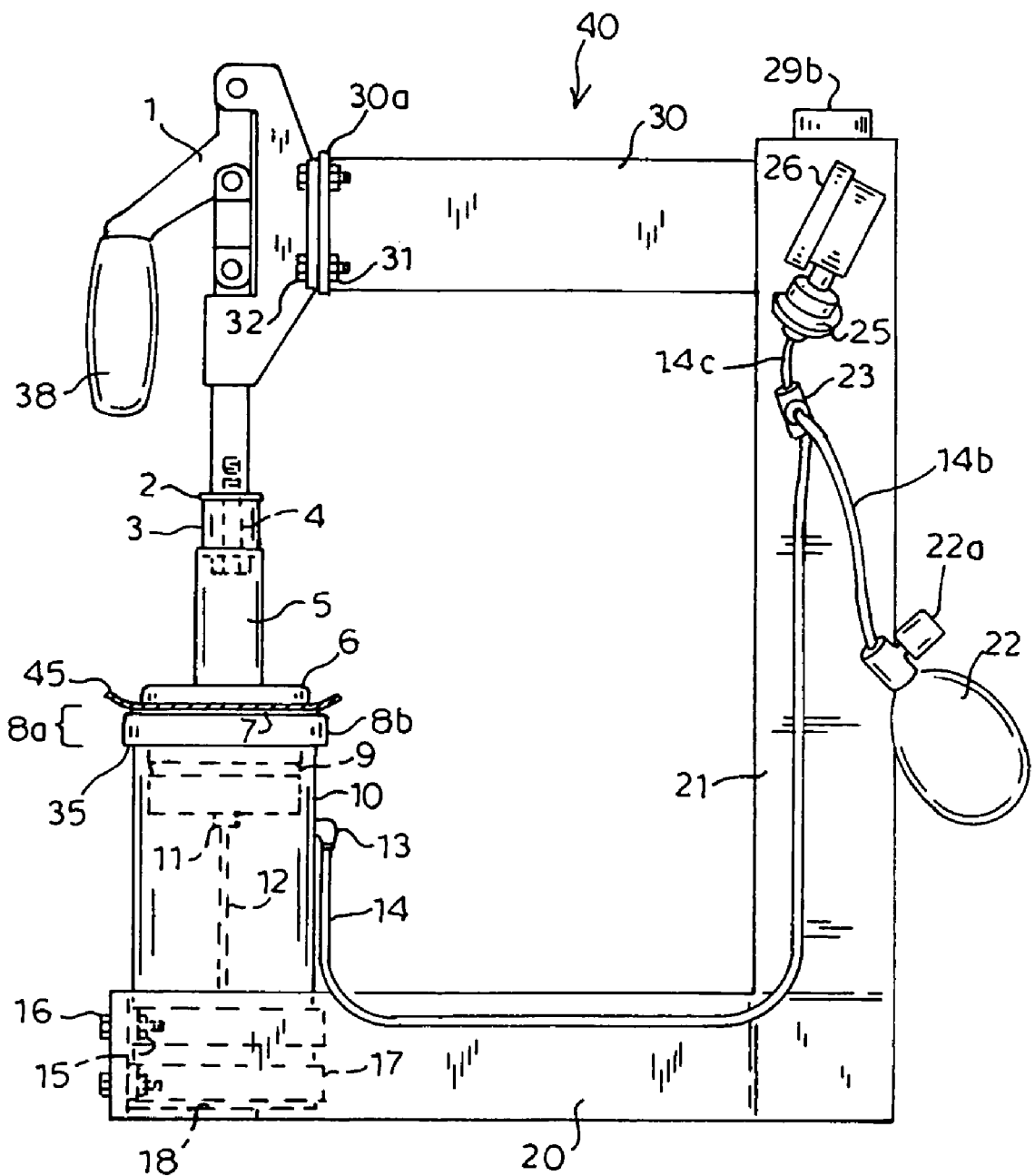
FIG. 1 is a side perspective view of a first embodiment of the hydrostatic tester of the invention herein.

Although the disclosure is detailed and exact to enable those skilled in the art to practice the invention, the physical embodiments herein disclosed merely exemplify the invention which may be embodied in other specific structure. The scope of the invention is defined in the claims appended hereto.

In particular, the invention is a hydrostatic tester for a test item, comprising:

a) a reservoir for water;
b) a test area;
c) a combination part that has a face and a retaining groove in the face, a seal system for the reservoir and a central hole opening to the reservoir when the combination part is placed on top of the reservoir wherein a test liquid can pass from the reservoir to the test area;
d) a gasket that has a central opening and forms a lower half of a sandwich seal, the gasket fitting tightly in the retaining grove in the face of the combination part with the upper surface of the gasket raised above the test area;
e) a straight line toggle clamp attached to an upper half of the sandwich seal, including a low profile seal ring with a rounded face that contacts the test item, which clamp lowers and raises the upper half of the sandwich seal, positions the upper half of the sandwich seal on the test item, and applies the downward force for the sandwich seal on the test item;
f) a constant force spring with a disbursement washer positioned between the straight line toggle clamp and upper half of the sandwich seal that maintains a consistent force on the sandwich seal when the clamp is lowered and engaged and compensates for thickness and texture of the test item;
g) a saddle attached to the upper half of the sandwich seal positioned between the constant force spring and low profile seal ring that provides a clear view of a test item during a test and lets the connecting bolt for the saddle, spring and washer to the clamp shaft to move freely when clamp is engaged;
h) a low profile seal ring attached to the saddle with a smooth oval face that comes in contact with a test item;
i) a lightweight, strong, portable compact frame;
j) a clamp arm that connects the straight line toggle clamp and upper half of the sandwich seal system to the frame with a pin and bearings so that the straight line toggle clamp and upper half of the sandwich seal can be moved to the side away from the test area when the clamp is disengaged providing unobstructed access to the test area for placement of the test item, and can be moved back and reposition over the test area for a test;
k) an adjustable air pressure source for exerting pressure to force water in the reservoir upward through the combination part to the test area against the test item clamped and sealed in the test area, wherein if the test item has a leakage area within the seal ring, water is forced upward through the leakage area by the air pressure exerted on the water in the reservoir;
l) a pressure regulating system to control the air pressure during the test, and a valve for releasing pressure after test completion; and
m) a visual pressure gauge positioned for easy viewing by an operator.

In the first embodiment discussed in more detail below, the reservoir forms a raised platform that supports a test area. In the second embodiment, the test area comprises a test face plate on a test arm, which is connected to a reservoir.

Figure 2:
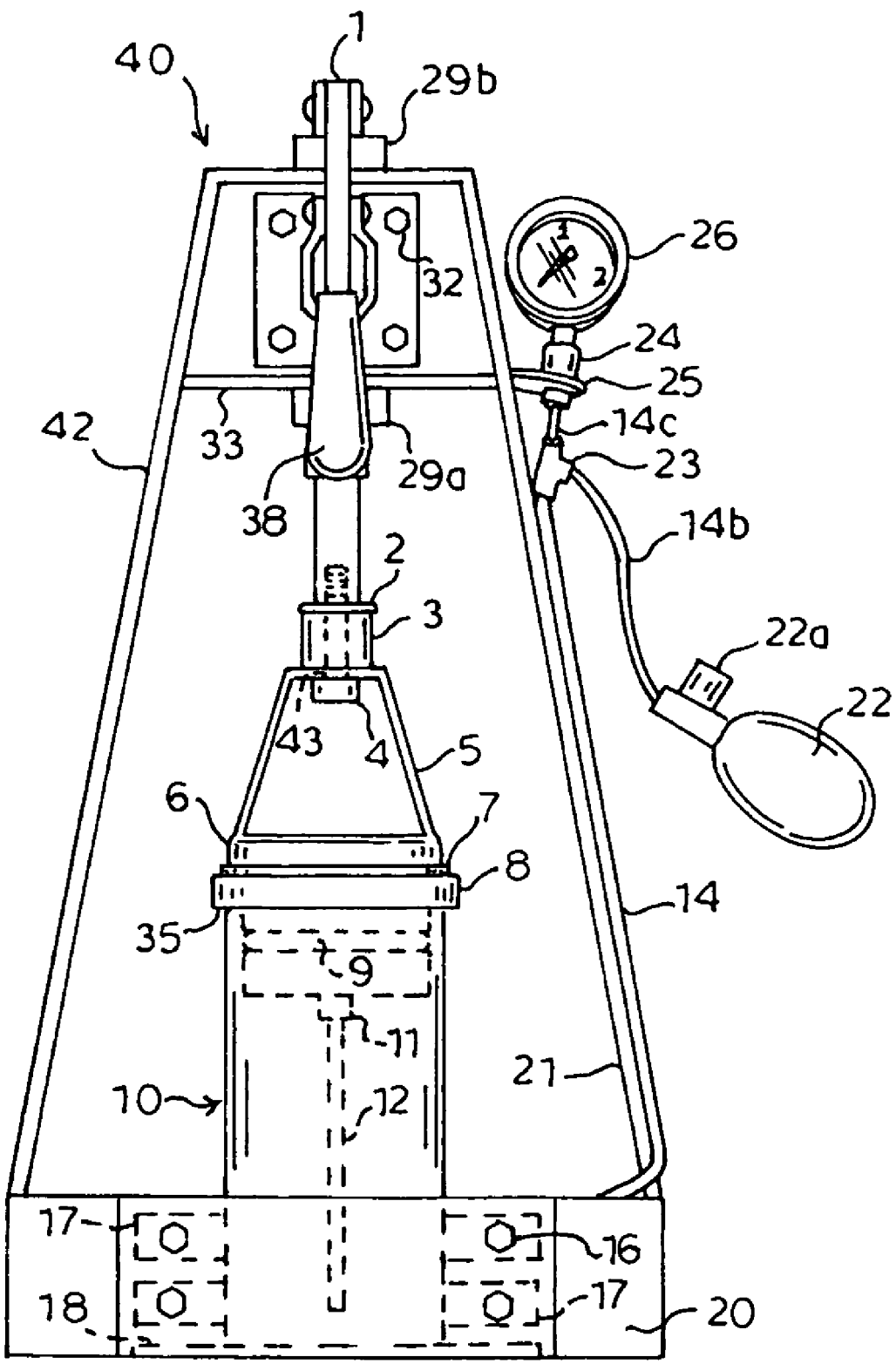
FIG. 2 is a front perspective view of the hydrostatic tester of FIG. 1.
Figure 3:
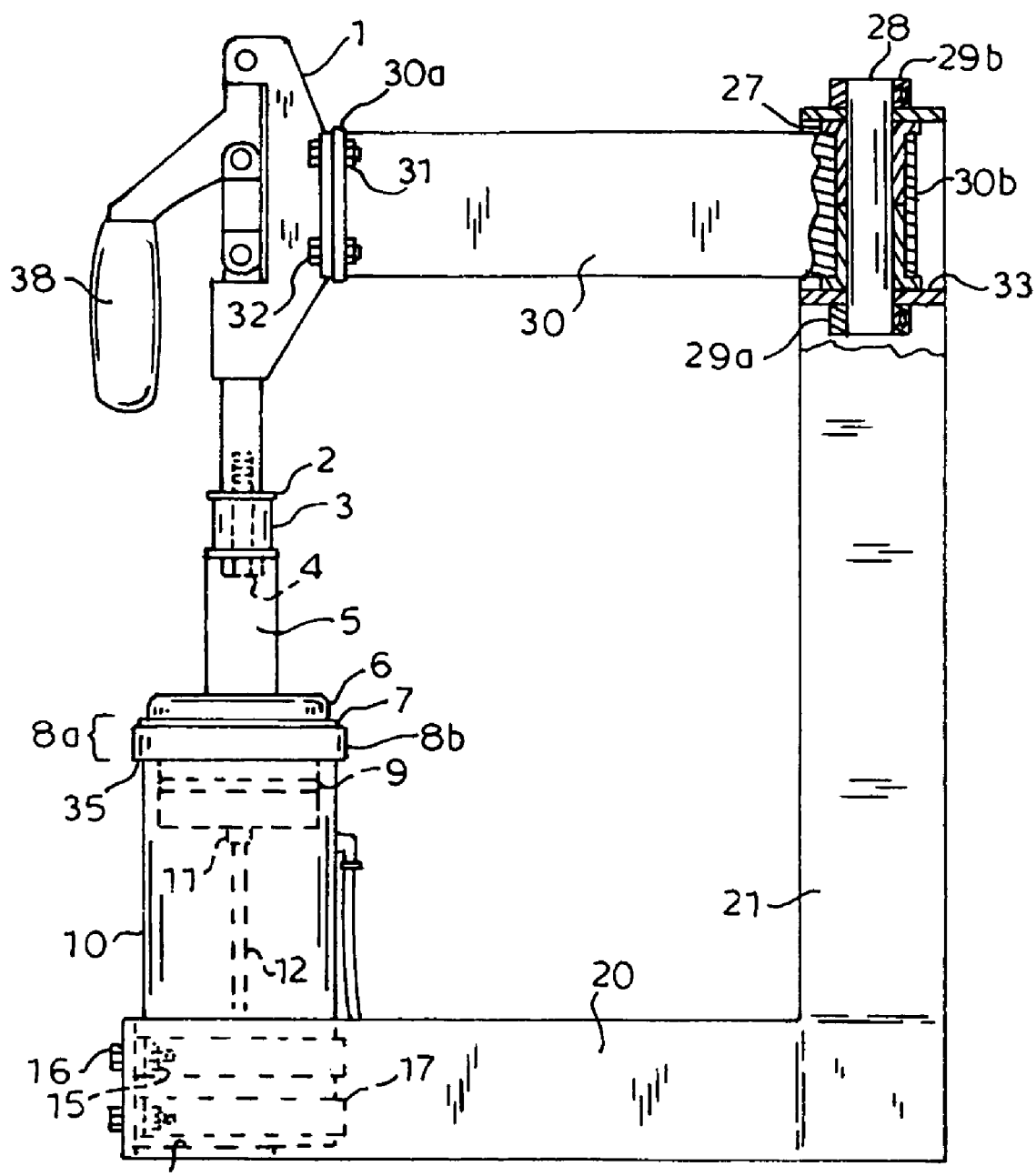
FIG. 3 is a side view of the hydrostatic tester of FIG. 1 showing a cross-section of the area where the clamp arm is attached to the riser frame.

Referring to FIGS. 1 through 9, the hydrostatic tester 40 of the first embodiment of the invention is illustrated. The hydrostatic tester 40 of the first embodiment has a test area 8a for placement of the fabric or garment 45 to be tested (FIG. 1). Preferably the test area 8a is at least 2 inches in diameter. The hydrostatic tester 40 uses a standard sandwich seal between a seal ring 6 (the upper portion of a sandwich seal) and gasket 7 (the lower portion of a sandwich seal) to secure the test item in place (FIGS. 2-3). The gasket is retained in a press fit groove (retaining groove 34 shown in FIG. 8) on top of the test area 8b of combination part 8a and that seals a reservoir 10 and provides a test platform. The retaining groove 34 is a central circular recessed area in the top of combination part 8a.

As used herein, the test face 8 includes gasket 7 and test area 8b. The term "pedestal" includes the assembled combination part 8a, o-ring 9, reservoir 10, and the various tubes/tube fittings/attachments thereto described herein.

The depth of the retaining groove 34 allows a portion of the gasket 7 to extend above the test area 8b of the combination part 8a and still retain gasket 7 securely in place during the positioning of a test item (FIGS. 1 and 7). The exposed or raised part of the gasket 7 prevents any hard contact between the test area 8b and seal ring 6 during testing that could cause damage to the test item. Gasket 7 has a central opening 19 that surrounds the test area 8b forming the area where the fabric 45 to be tested is observable during testing (FIG. 6). The gasket selection is determined by the memory characteristic, durometer, permeability and tear characteristics of the material. The combination part 8a can be made of any suitable material, such as plastic or aluminum. The ledge 35 portion of the combination part 8a rests on top of the rim of the reservoir 10 supporting the downward force during the sealing procedure. The bottom portion of the combination part 8a has a slip fit between its OD and the ID of the reservoir 10. The depth of insertion, the slip fit, o-ring 9 friction and the ledge 35 resting on the reservoir rim provides a very stable test area. O-ring 9 selection and the o-ring groove 36 size are from standard selection guides for this environment. Although an o-ring is used to seal the reservoir, other methods are viable. A face seal 46 (FIG. 7a) between the combination part ledge 35 and the top rim of the reservoir 10 is used in a second embodiment of the invention herein. The face seal 46 seals any time the clamp 1 is engaged. Other sealing methods can be evaluated on cost verses benefits review. In any case, the hydrostatic tester of the invention can be sealed on a material to be tested by being placed between an upper seal and a lower seal over the reservoir of the invention.

The liquid transfer hole 37 in the center of the combination part is part of the liquid transfer system used to move the liquid from the reservoir 10 to the test area (FIG. 8). Tube fitting 11 is threaded into bottom of the liquid transfer hole 37 where a tube 12 is connected that extends to the bottom of the reservoir 10 (FIG. 7). When air pressure is applied by means of blood pressure bulb 22 (or other air pressure means known in the art) to the inside of the reservoir 10, liquid is forced up through the tube 12 and liquid transfer hole 37 to the test area.

The reservoir 10 of the first embodiment (as shown for example in FIG. 9) is cylinder-shaped with a height that can accommodate the testing of completed garments and the strength to withstand the downward force required to seal test area. Reservoir shape, size and material can vary. One preferred material is PVC pipe. Preferably the reservoir is at least 6 inches high so that a selected portion of the garment can be pulled over the top of the reservoir to expose the area of the garment to be tested.

Retaining clamp 17 secures the reservoir 10 in place (FIGS. 2-5). Bolt 16 and nut 15 secure the clamp 17 to the frame base 20. Support plate 18 is welded to the frame base 20 and supports the reservoir 10 when downward force is applied during sealing process. The riser frame 21 is generally angled inward at the top so that the gauge positioned toward the top of the riser frame 21 does not stick out past the footprint of base 20 to help protect the gauge from damage.

The seal ring 6 has a smooth rounded shape without sharp edges in cross-section (not shown) so as not to damage the test item when sealed between the seal ring 6 and gasket 7. The saddle 5 attached to the seal ring 6 provides an unobstructed view of the test area. A mounting bolt 4 attaches saddle 5 by way of a clearance hole 43 in the top of the saddle 5 to the straight-line action clamp 1 (FIG. 2). Between the saddle 5 and clamp 1, a constant force spring 3 with pressure disbursement washer 2 are used to maintain a consistent pressure force on the sandwich seal make up as test item gauge, texture and surface irregularities change. When the clamp is engaged, the spring compresses or becomes shorter, so the spring, washer and saddle need to slide on the bolt. About ⅜" of the bolt will extend below the saddle when the clamp is engaged. The spring operates as a force regulator during the seal of the test area. The spring 3 also compensates for minor misalignment between the face of gasket 7 and the face of seal ring 6. This is an important feature when testing completed garments where seams need to be tested. A predetermined load is put on the spring 3 through a set torque of the mounting bolt 4. A thread locking substance as known in the art holds mounting bolt 4 in position. Other means such as lock nuts could be used for this purpose. Other mounting means could be used such as shoulder bolts where a predetermined shoulder length and spring length could be used in place of torque settings.

Figure 5:
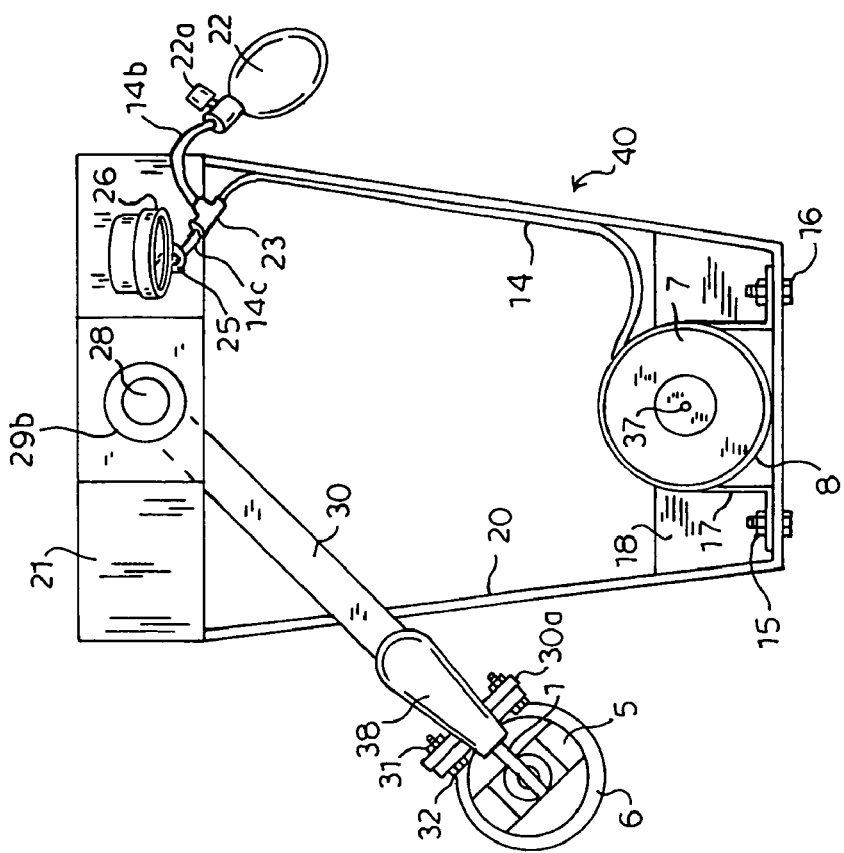
FIG. 5 is a top plan view of the hydrostatic tester of FIG. 1 showing the clamp arm moved to the side away from the test area.
Figure 4:
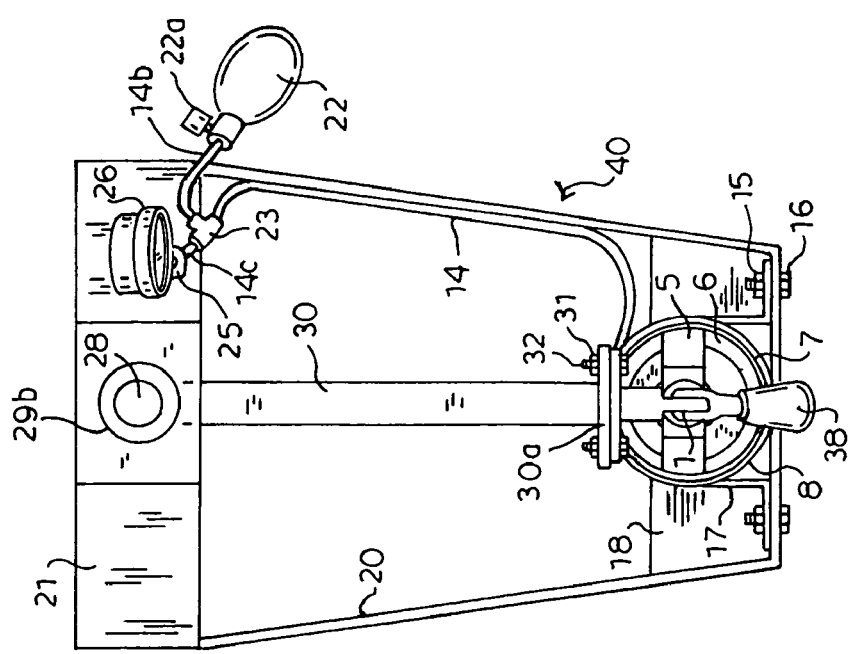
FIG. 4 is a top plan view of the hydrostatic tester of FIG. 1 showing the clamp arm in position over the test area.
Figure 9:
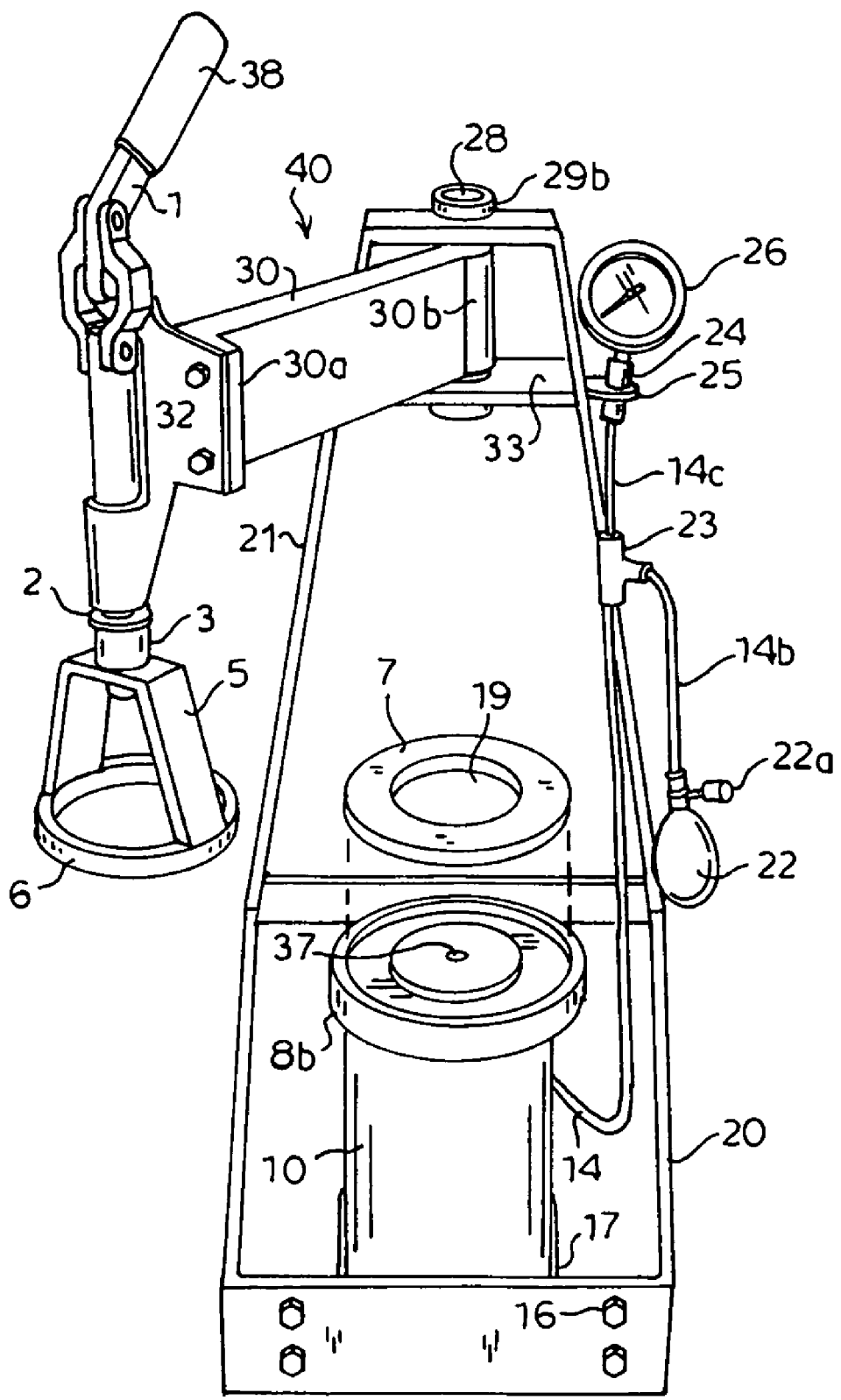
FIG. 9 is a front perspective view of the hydrostatic tester of the invention of FIG. 1 showing the clamp arm swung to the side and an exploded view of the test area.

The straight-line action clamp 1 has a large rubber coated clamp handle 38 for operator convenience (FIGS. 1-5 and 9). The repeatable travel pattern of clamp 1 provides consistent downward force for the sandwich seal and position of the seal ring 6. Bolts 32 and nuts 31 are the mounting hardware used to attach clamp 1 to the clamp mounting bracket 30a on clamp arm 30. The position change in clamp arm 30 shown in FIGS. 4-5 and 9 illustrates the importance of this feature in providing an unobstructed access to test area when positioning an item to be tested over the pedestal. When seal ring 6 is raised (seal force released) by way of lifting the clamp 1 handle to the up position as shown in FIG. 9, the clamp arm 30 can be moved to the left or h providing easy right access to the test area.

Clamp arm 30 is attached to riser frame 21 with a removable pin 28 (FIG. 3). Shoulder bearings 27 are pressed into the cylinder 30b on clamp arm 30. They provide the easy movement of the clamp arm 30. Pin 28 inserts through lock collar 29a, bearings 27 and lock collar 29b to secure clamp arm 30 in place. Once the pin 28 is in place, the set screws in lock collars 29a and 29b hold pin 28 in place. Bracket 33 is the lower support for clamp arm 30 mounting and has lock collar 29a is attached to it.

Pressure to create the hydrostatic test is derived from a blood pressure bulb 22 (FIGS. 1-2, 4-5 and 9). The bulb 22 is connected to the reservoir 10 and pressure gauge 26 by way of tubing 14 and tube fittings 13, 23, & 24. The gauge is threaded to a female NPT (National Pipe Thread) to tube bulkhead fitting 24 that is mounted to a bracket 25 attached to riser frame 21. The location of bracket 25 on the riser frame 21 and the angle of the bracket 25 provides easy viewing of gauge 26.

Figure 10:
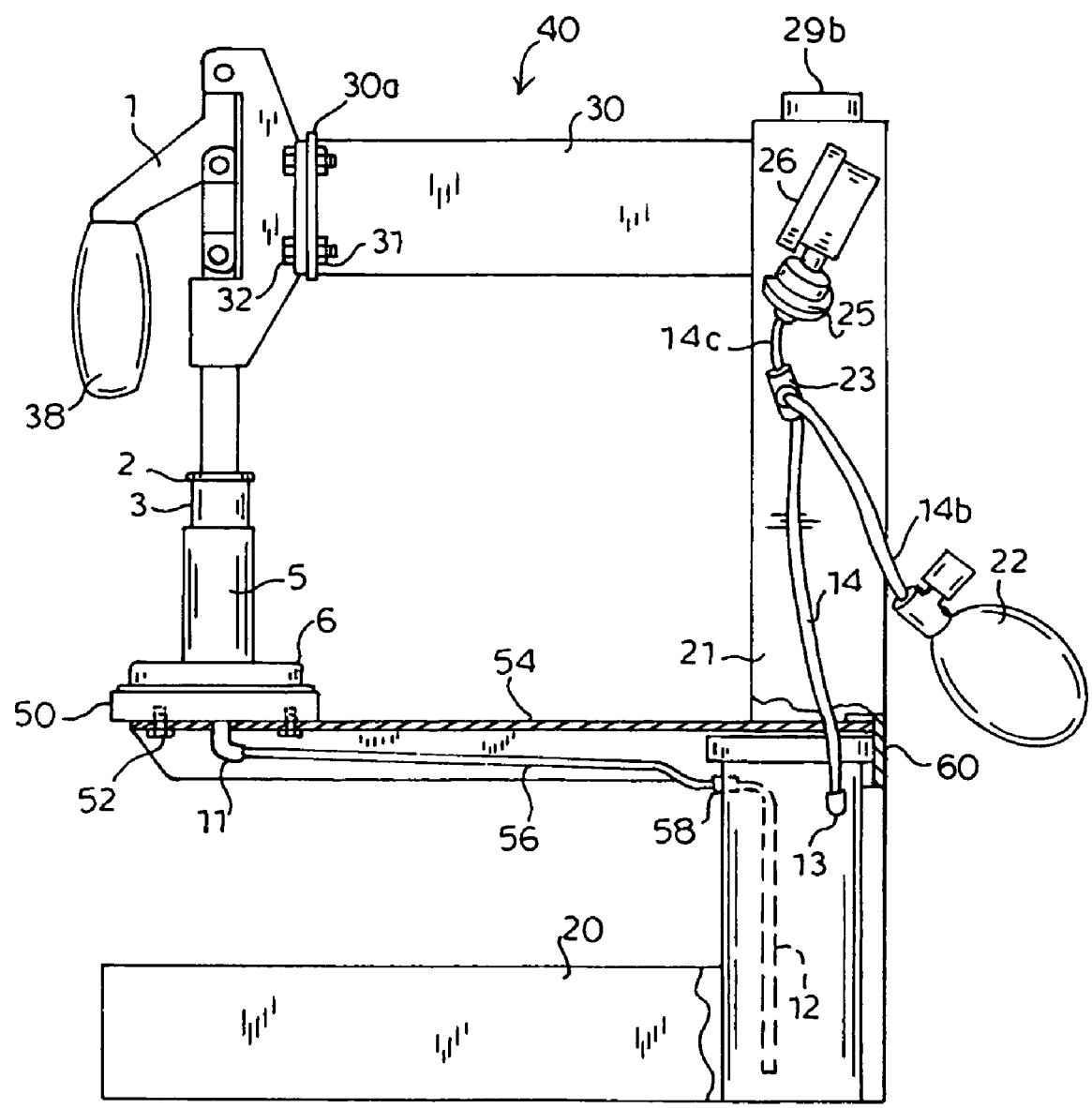
FIG. 10 is a side perspective view of a second embodiment of the hydrostatic tester of the invention herein.

A second embodiment of the invention is shown in FIG. 10 in which a test arm 54 performs the same function as the pedestal-style test surface of the first embodiment discussed above. The test arm 54 is a horizontal support that attaches to the riser frame 21 as shown, and extends outwardly from the riser frame 21 about 10 inches in the preferred embodiment. The shape, size and material of test arm 54 provide a rigid arm that supports a downward force from clamp 1 to seal the test item in place on the test face plate 50 having the same face design as combination part 8a described above. An open area below the test arm 54 and between the test arm 54 and frame base 20 is sufficient to handle the test item excess (for example, extra portions of a garment that is being tested). In this second embodiment, the clamp arm 30 functions the same as in the first embodiment discussed herein in that it is movable to form the top half of a sandwich over an area upon which the fabric to be tested is placed, which in this embodiment is test face plate 50. Test face plate 50 is preferably attached to test arm 54 by mounting bolts 52, and similar to the first embodiment, has a central hole (not shown), which is connected to a reservoir by way of tube 56 and tube fittings 58. The reservoir is not limited to a single shape or material, and can be attached to the frame or free-standing in this embodiment. Connections from the reservoir for transfer of a test liquid such as water, to test face plate 50 and to the blood pressure bulb 22 can be made though the reservoir's side or through the reservoir's lid or cap. The reservoir lid or cap in this embodiment can be for example a screw-on lid or clip on cap or other lid or cap as known in the art.

To use the invention in the preferred embodiments shown herein, the following items are required:
   a. One quart of distilled water
   b. Convenient location for test, such as a table counter top etc.

To fill the reservoir:
1. Raise clamp handle 38 to the completely open position.
2. Move clamp arm 30 to the left to provide clear access to test pedestal 39.
3. Close the valve on blood pressure bulb 22 by turning it clockwise as known in the art. Do not over-tighten valve.
4. Seal hole 37 in the center of the test area 8b by placing a left finger over hole 37. Light finger pressure will seal hole 37.
5. Compress bulb 22 with the right hand several times watching the gauge 26. Compress bulb 22 until gauge 26 reads the maximum pressure.
6. The reservoir seal plate (also called combination part 8a) should be forced out of the reservoir 10 by the hydraulic pressure in the reservoir.
7. If it does not release on its own a small amount of lifting force may be required on the combination part 8a, ledge 35.
8. Pressure will be released when the reservoir seal 9 is disengaged and gauge 26 will read zero.
9. Remove the seal assembly (combination part 8a) and set aside for later replacement.
10. Using distilled water fill reservoir 10 to just below the tube fitting 13 on the side of reservoir. Warning: Trapped air inside the reservoir 10 can become compressed during assembly and force water out the hole 37 in the center of test surface face.
11. Using standard lubricating grease, coat the o-ring 9 and surface area around it. Care should be taken to keep grease away from the water level.
12. Fully open the valve 22a (counter-clockwise) on the blood pressure bulb 22.
13. Place the combination part 8a in position on top of reservoir 10 making sure the tube 12 is not damaged.
14. Move the clamp arm 30 back into position directly over the test area 8b.
15. Lower the seal ring 6, without applying pressure, to rest on the test area 8b.
16. Using a finger, seal the hole 37 again. This will prevent water from being forced out of the reservoir and forces the trapped air out through the valve on the pressure bulb 22.

17. Using steady pressure, lower clamp handle 38 pressing the combination part 8a down and the reservoir seal (o-ring 9) down inside reservoir 10.

To test the hydrostatic water pressure test:
1. With the reservoir 10 filled, raise the clamp 1 and move the clamp arm 30 to one side.
2. Select the area of the garment 45 to be tested and position it over the top of the pedestal 39. Smooth out any folds or wrinkles.
3. Move the clamp arm 30 back in position directly over the test area. Lower the seal ring 6 to touch the test area 8b. Make sure it is centered over the test area 8b.
4. Engage the clamp 1 by forcing the clamp handle 38 in the downward direction.
5. Close the valve on the blood pressure bulb 22. Do not over-tighten.
6. With the test area 8b sealed and the valve 22a closed, watch the gauge 26 as you compress and release the bulb 22 to increase to the desired pressure. Slight pressure adjustments might be required as the o-ring 9 seats. Over-pressure can be relieved by opening and closing bulb valve 22a.
7. After a few pressure cycles, it will become very easy.
8. View the test area for water leaks and seepage.
9. Check the gauge pressure 26 to make sure that test pressure is correct.
10. Maintain the hydrostatic pressure in accordance with your test parameters.
11. To release pressure, open the valve 22a.
12. Disengage the clamp 1 and move the clamp arm 30 to one side.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A hydrostatic tester for a test item, comprising:
   a) a reservoir for a test liquid;
   b) a test area on a lower half of a sandwich seal, wherein the test liquid can pass from the reservoir to the test area;
   c) a straight line toggle clamp attached to an upper half of the sandwich seal, including a low profile seal ring with a rounded face that contacts the test item, which clamp lowers and raises the upper half of the sandwich seal, positions the upper half of the sandwich seal on the test item, and applies the downward force for the sandwich seal on the test item;
   d) a constant force spring with a disbursement washer positioned between the straight line toggle clamp and upper half of the sandwich seal that maintains a consistent force on the sandwich seal when the clamp is lowered and engaged and compensates for thickness and texture of the test item;
   e) a saddle attached to the upper half of the sandwich seal positioned between the constant force spring and the low profile seal ring that provides a clear view of a test item during a test, wherein a bolt connecting the saddle, constant force spring and disbursement washer to the clamp shaft moves freely when the clamp is engaged;
   f) a frame;
   g) a clamp arm that connects the straight line toggle clamp and upper half of the sandwich seal system to the frame with a pin and bearings so that the straight line toggle clamp and upper half of the sandwich seal can be moved to the side away from the test area when the clamp is disengaged providing unobstructed access to the test area for placement of the test item, and can be moved back and repositioned over the test area for a test;
   h) an adjustable air pressure source for exerting pressure to force the test liquid in the reservoir upward to the test area against the test item clamped and sealed in the test area, wherein if the test item has a leakage area within the seal ring, the test liquid is forced upward through the leakage area by the air pressure exerted on the test liquid in the reservoir;
   i) a pressure regulating system to control the air pressure during the test, and a valve for releasing pressure after test completion; and
   j) a visual pressure gauge positioned for easy viewing by an operator.

2. The hydrostatic tester of claim 1, further comprising a test arm, and a face plate on the test arm that forms the test area.

3. The hydrostatic tester of claim 1, wherein the reservoir forms a raised platform that supports the test area, the hydrostatic tester further comprising:
   a) a combination part that has a face and a retaining groove in the face, a seal system for the reservoir comprising a sandwich seal, and a central hole opening to the reservoir wherein when the combination part is placed on top of the reservoir the test liquid can pass from the reservoir to the test area; and
   b) a gasket that has a central opening and forms a lower half of a sandwich seal, the gasket fitting tightly in the retaining grove in the face of the combination part with the upper surface of the gasket raised above the test area.

4. The hydrostatic tester of claim 3, further comprising an o-ring on the combination part positioned in a groove to seal the combination part within the top of the reservoir.

5. The hydrostatic tester of claim 3, further comprising a face seal on the combination part to seal the combination part on the top of the reservoir.

6. A method of hydrostatically testing a test item, comprising:
   a) providing a hydrostatic tester according to claim 1;
   b) placing the test item on the test area;
   c) utilizing the air pressure source to exert pressure to force the test liquid to the test area; and
   d) determining if the test liquid has been forced upward through the test item.

* * * * *